United States Patent [19]

Klink et al.

[11] Patent Number: 4,987,832
[45] Date of Patent: Jan. 29, 1991

[54] METHOD AND APPARATUS FOR INCREASING THE EFFECTIVENESS OF PROJECTILES

[75] Inventors: Paul Klink, Wiesenbach; Gunter Wichmann, Leimen; Gerhard Dahm, Hohr-Grenzhausen, all of Fed. Rep. of Germany

[73] Assignee: Eltro GmbH, Fed. Rep. of Germany

[21] Appl. No.: 487,578

[22] Filed: Apr. 22, 1983

[30] Foreign Application Priority Data

Apr. 28, 1982 [DE] Fed. Rep. of Germany ....... 3215845

[51] Int. Cl.$^5$ ............................................. F42C 13/02
[52] U.S. Cl. .................................................. 102/213
[58] Field of Search .............................. 102/213, 476

[56] References Cited

U.S. PATENT DOCUMENTS

| | | | |
|---|---|---|---|
| 3,554,129 | 1/1971 | Alpers | 102/213 |
| 3,661,459 | 5/1972 | Aoki | 356/4 |
| 3,935,818 | 2/1976 | Johnson et al. | 102/213 |
| 4,223,607 | 9/1980 | Muller et al. | 102/213 |
| 4,332,468 | 6/1982 | Stutzle | 102/213 |
| 4,497,252 | 2/1985 | Taylor | 102/213 |
| 4,556,313 | 12/1985 | Miller, Jr. et al. | 102/213 |

FOREIGN PATENT DOCUMENTS

2457497 6/1976 Fed. Rep. of Germany ...... 102/213

Primary Examiner—Charles T. Jordan
Attorney, Agent, or Firm—Handal & Morofsky

[57] ABSTRACT

In order to improve the attack capabilities against armor or combat vehicles and combat aircraft, projectiles (2) must be detonated at a small distance ahead of the impact point on the target (1). This distance cannot be determined mechanically or even with the customary pulse time-of-flight method. In order to insure the resolution of such distances, lying mostly in the region from 0.5 to 2.0 meters, the projectile is equipped with a laser range finder (3) that operates on the sampling principle and permits exact measurements. The range finder may be used as a distance detector or as an approach sensor. In the latter case, the most favorable point of time is determined in that the sampling pulses are used to set several distance gates by means of which additional information for target analysis can be obtained.

23 Claims, 7 Drawing Sheets

METHOD AND APPARATUS FOR INCREASING THE EFFECTIVENESS OF PROJECTILES

TECHNICAL FIELD

The invention relates to a method for increasing the effectiveness of projectiles which are in flight toward a target and which contain a hollow charge, fragmentation ordnance or the like, as well as to an apparatus for carrying out the aforesaid method.

BACKGROUND ART

A projectile equipped with an optical proximity sensor is known from DE Pat. No. 23 50 345. The sensor described therein includes a laser transmitter which emits light in a direction perpendicular to the direction of motion of the projectile and a laser receiver which is oriented with a base perpendicular to the direction of emission and which has an optical axis inclined with respect to the optical axis of the laser transmitter. The receiver is composed of two detectors that become effective for different ranges of distance so that a target that moves past the sensor can be measured in defined steps of distance. However, as this sensor is oriented transversely with respect to the direction of flight, it becomes impossible to use it either for a forward measurement or for the determination of very small distances from the target (and these are the very distances within which a projectile should be detonated for maximum effect), as this latter measurement requires high precision.

U.S. Pat. Nos. 2,951,181 and 3,278,846 describe devices that operate according to the sampling principle. Similar devices or methods using electronic gate circuits are include in DE Pat. No. 1,266,346 and DL Pat. No. 28,819. According to DE Pat. No. 2,827,856 a laser range finder that operates on the principle of pulse propagation time measurement sets distance gates to make a qualitative determination of possible deposition of a first projectile equipped with an illuminating device and, thereafter, to make a corresponding correction of the direction of a second shot.

DISCLOSURE OF INVENTION

The object of the present invention is detection of the distance of a projectile from its target which insures maximum effect. This object is attained, according to the invention, by mounting a laser range finder operating on the so-called sampling principle, on the tip of the projectile to act as a distance or proximity sensor to determine the optimum firing point.

One of the principal advantages of this method is that it makes possible the exact setting of the distance and the time for a projectile or flying object that will result in the maximum possible weapon effect.

BRIEF DESCRIPTION OF DRAWINGS

One way of carrying out the invention is described in detail below with reference to the drawings which illustrate a preferred embodiment, in which.

BEST MODE FOR CARRYING OUT THE INVENTION

In accordance with the present invention, it is suitable that the velocity of approach between the sensor and the target and the length of the emitted laser pulse of its extent in free space are used to generate the frequency content of the low-frequency pulse obtained by the sampling principle. A laser range finder operating on the pulse propagation time principle can emit very short laser pulses whose leading edge in the receiver channel is less than 1 nsec to approximately 2 nsec so that a very precise distance measurement having a tolerance range of less than $+/-5$ cm. is possible without additional effort. Depending on the speed of approach and the sensor disposition, the pulse frequency is made very high, from approximately 100 kHz to several megahertz, in order that a low-frequency representation of the laser pulse can be generated on the receiver side by means of the sampling principle and the use of a low-frequency operational amplifier, to initiate the firing sequence at the desired point in time. The increase of the signal-to-noise ratio results in an increase in the sensitivity of the system so that the power reserve so gained may be used to provide a wider spatial angle to enlarge the laser beam bundle. Because of the sensitivity of the sensor to pulses of the selected wave-length in the nanosecond domain and because these pulses must also arrive in synchronism with the statistical receiver pulse, such a sensor has extreme security against all intentional and unintentional disturbances from the sun, the background or the enemy.

As the receiver sampling pulse may itself carry noise, it may be necessary, in very sensitive systems, to use a push-pull circuit in connection with the sampling principle wherein the signal pulse or the sampling pulse is produced in opposite phase, for example via a transformer. This method cancels amplitude-modulating noise of the receiver sampling pulse.

For the special case of a distance sensor to measure one or several exactly defined distances lying between a few centimeters and several meters, the method of the invention may be simplified in that the frequency- or phase-modulation as between the signal pulse and the receiver sampling pulse required by the sampling principle is replaced by the modulation which is produced automatically by the decreasing pulse propagation time occurring from one period to the next due to the reduction in the distance. In connection with the high degree of precision in measuring distance, it is also possible to make an exact three-dimensional definition of the detection range of such a sensor.

In addition to being used with artillery and helicopter ordnance, the method of the invention is especially significant when used on hollow charge munitions for use against armored vehicles because, in those cases, the optimized penetration power of the projectile takes place with a laser emission beam that has been widened to the diameter of the caliber.

If the electronic equipment being used is suitably augmented, the subject matter of the invention offers great flexibility for using algorithms to determine the properties of the target, to measure the approach velocities, the receiving angle and to provide for additional coding. For example, to obtain the best possible firing point for a projectile that has been deflected by the target, a so-called shoulder hit, the diameter of the caliber may be measured during the flight by setting at least one distance gate during the approach with the aid of the distance sensor. Defined and limited distance ranges or combinations of several different sensors are also meaningful in the preceding context.

A further development of the invention provides for a corresponding apparatus in which a laser range finder consisting of a transmitting and receiving unit and operating on the sampling principle is mounted at the tip of the projectile, either externally or internally and in symmetry with respect to the longitudinal axis. The mounting is such that there is a space between the transmitting and receiving units for a passage for an S shaped spike being formed within the projectile along the axis.

Regarding the disposition and design of constructional details, it may be of advantage that, at the distance of the ogive, the top of the funnel-shapped insert lies opposite the laser range finder and that an impact fuse is provided in the region of the laser range finder and is connected to a firing mechanism within the projectile.

Regarding the amount of necessary circuitry, what is required is advantageously that the load resistance of a laser receiver diode which is biased by a pulse generator acting via a high-voltage stage is connected to a sampling diode and then connected in series with a low-frequency amplifier and a trigger pulse generator. Further, a sampling pulse which is coupled out of the pulse generator is passed through a delay circuit and is applied directly ahead of the low-frequency amplifier; directly beyond the low-frequency amplifier, a portion of the amplified noise signal is used as a feedback control signal for automatic control of the high-voltage stage. A charging resistor which is grounded at one end has its other end connected to the point ahead of the low-frequency amplifier where the sampling pulse enters and that a load resistor is grounded at one end and has its other end connected between the receiver and sampling diodes. However, this applies only for detecting a definite distance and the use of only one distance gate. If several distance gates are used, it is necessary to provide, for each such gate, an additional delay member for the received sampling pulse as well as a further receiver diode, a further charging capacitor and a further low-frequency amplifier.

It may also be advantageous to make the load resistor to be frequency-dependent (inductive). Such a resistor represents a short-circuit to the low-frequency amplifier which makes the method insensitive to any kind of background radiation as the latter is always modulated at low-frequency by comparison. Even artificial pulses in the nanosecond region are disturbing only if these occur synchronously with the receiver sampling pulse and are, thus, detected by the sampling method, but this is relatively improbable.

In order to obtain the customary sampling, the invention provides that the pulse generator is a trigger for a monostable multivibrator whose time constant can be varied by means of a modulation generator.

Figure 1:
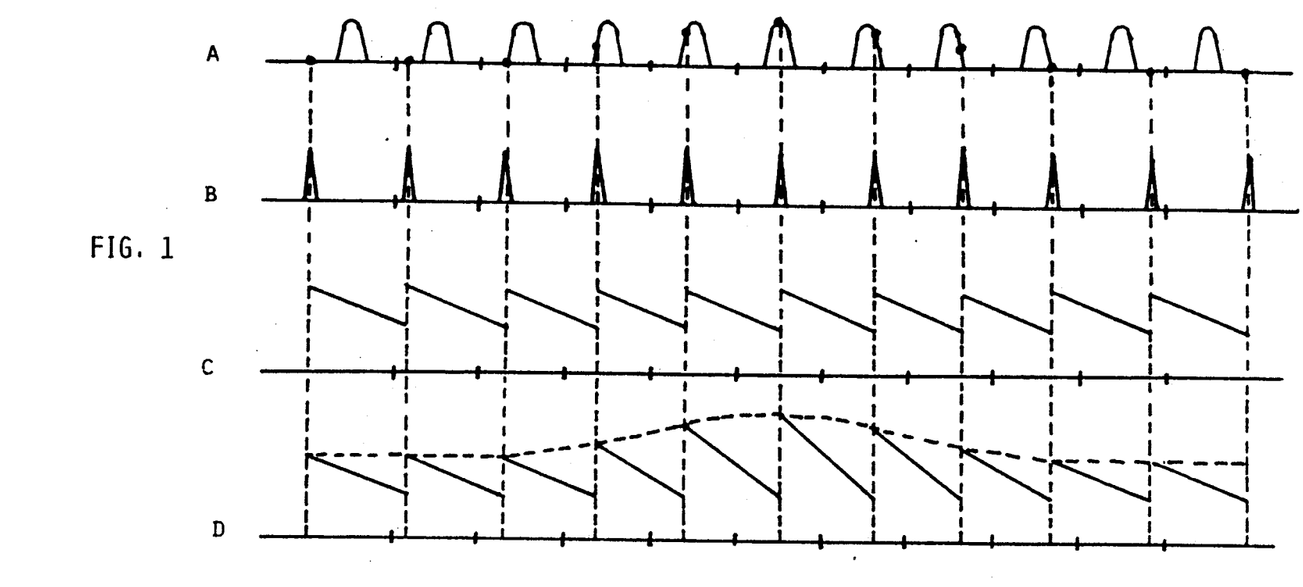
FIG. 1 is the pulse timing diagram of a simple sampling method.
Figure 2:
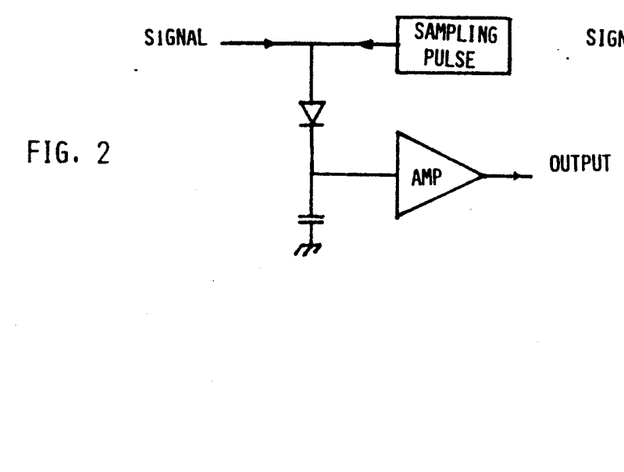
FIG. 2 is the circuit diagram for FIG. 1 with a sampling pulse that is phase modulated relative to the signal.
Figure 3:
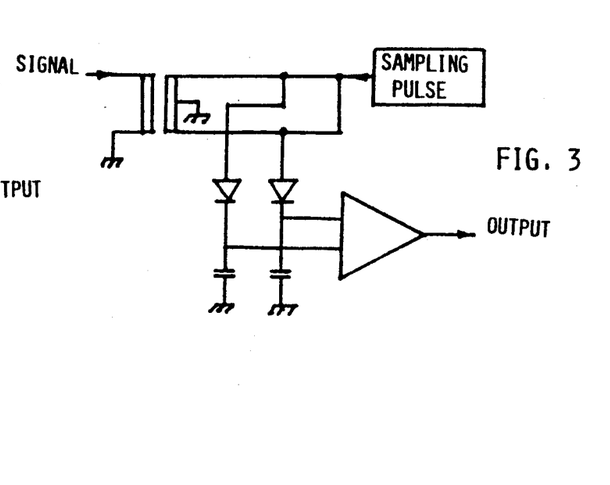
FIG. 3 is a variant of the circuit diagram of FIG. 2 with a counter-phase signal.

In FIG. 1a a signal whose frequency is known, is to be received. To this end, as shown in FIG. 1b, a sampling pulse is generated. This pulse has the same frequency as the signal pulse to be received but is phase-modulated relative thereto. As a result, it meets different instantaneous values of the signal pulse in different periods. Both the signal and sampling pulses, indicated in FIG. 2 by opposite arrows, are passed via a diode to a capacitor. At the output of an amplifier connected between the diode and the capacitor, there is obtained a saw-tooth voltage whose peak amplitude is the sum of the two instantaneous values of the signals. If the input signal is zero, one would obtain the voltage curve shown in FIG. 1c. If a signal pulse is present, a low-frequency signal is generated which, as shown in FIG. 1d, corresponds to the original pulse, but is extended in time. As the sampling pulse may have noise, in highly sensitive systems the amplitude noise is cancelled with a push-pull circuit shown in FIG. 3 where either the signal or the sampling pulse is produced in counter-phase, for example by a transformer. The above explanations are not the subject matter of this invention but serve to explain the sampling method which is known.

Figure 4A:
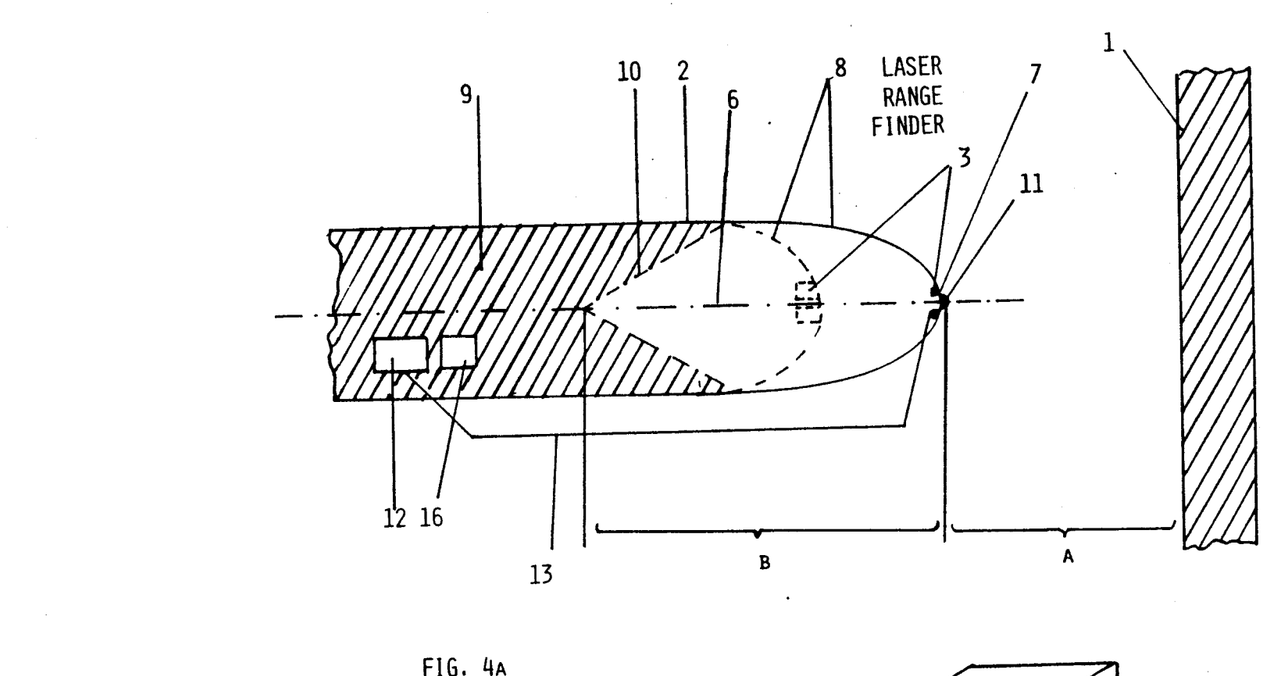
FIGS. 4a and 4b are diagrams showing the principle of the projectile equipped as provided by the invention.

The increasing protective measures for battle tanks, for example, include, among others, a fortification of its exterior wall 1 as shown in FIG. 4.

As a consequence, an effective attack requires projectiles of larger caliber. In turn, the firing point, or the stand-off point, must be further displaced, approximately 50 to 200 cm ahead of the target, as illustrated in FIG. 4 by the distance a + b.

Figure 4B:
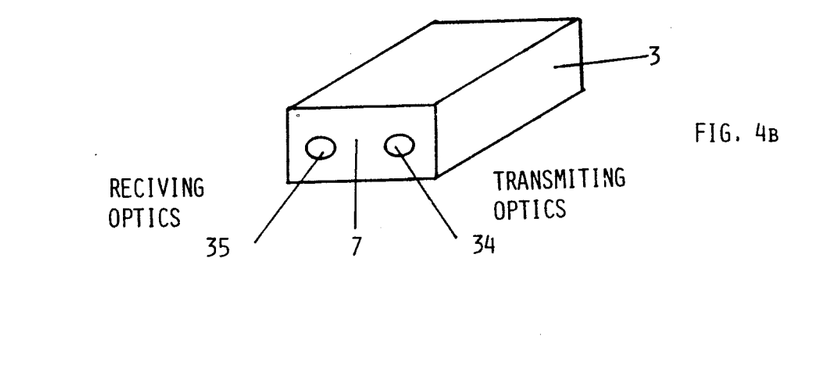
Figure 6:
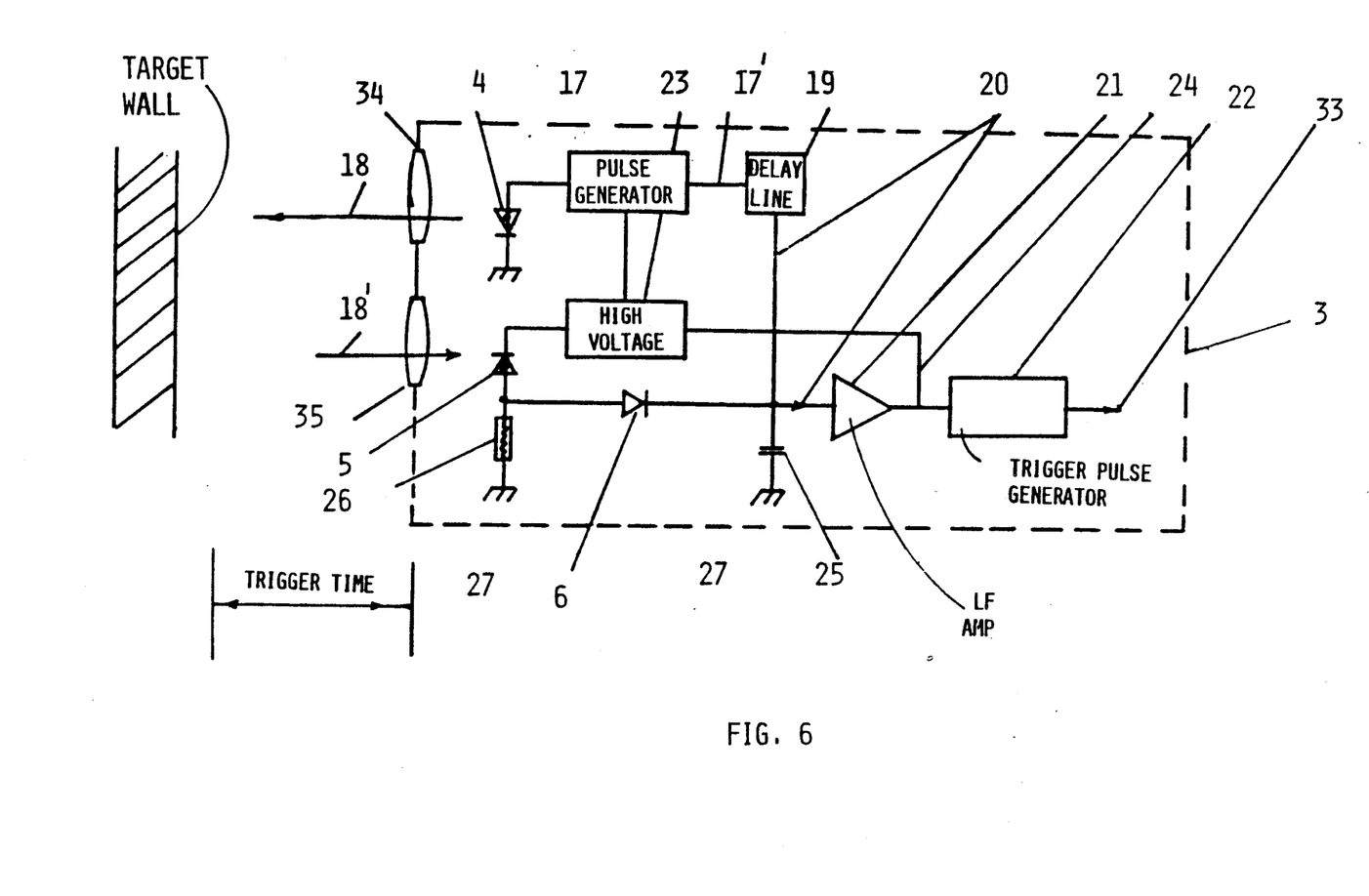
FIG. 6 is a block diagram of the laser fuse provided in the projectile of FIG. 4 with a single distance gate.

Due to a lack of resolution, mechanical methods or even customary pulse propagation time measurements cannot be used for such precise distance measurements. Therefore, the inventive projectile is equipped at its tip with a laser range finder 3 operating on the sampling principle; this range finder is shown enlarged and separately below the main figure. It includes transmitting optics 34 and receiving optics 35, each having optoelectronic channels consisting of transmitting and receiving units and associated respective diodes 4 and 5 (FIG. 6). This sensor can be embodied as a distance or approach sensor and is disposed symmetrically with respect to the longitudinal axis 6 in such a way that a central passage 7 (FIG. 46) remains between the transmitting and receiving units. Opposite the sensor, in the rearward portion of the projectile 2, and at the distance of the ogive 8, the sensor is opposed by the tip of the funnel-shaped insert 10 of the hollow charge 9 behind which is located the propulsion charge 16. After ignition, a so-called hollow charge spike is created by material deformation of the insert which may consist, for example of copper. The hollow charge spike penetrates the passage 11 and, after impact on the target, enters the wall 1 thereof. For reasons of functional reliability, an impact fuse may be provided additionally in the region of the tip of the projectile. This fuse is connected electrically by the cable 13 to the firing mechanism 12 located in the interior of the projectile, usually behind the propulsion charge 16. The impact fuse 11 and the laser range finder 3 may be mounted on the outside or, as shown with the dashed, shortened ogive 8, inside the wall of the projectile. Of course, it is also possible to use the described projectile for attacks against artillery or helicopters, in addition to that against tanks.

In the embodiment of a distance sensor of the kind described above, the sampling principle is used to set, if necessary, a single distance gate at the most favorable distance from the target, so that ignition may be initiated at that point.

If the projectile becomes a so-called "shoulder hit'-',i.e., that, after a short contact, the target deflects the projectile in another direction, then the hollow-charge spike will not be effective. However, some success may be obtained even in this case, provided that the projectile also carries fragmentation ordnance. If the projectile is effecive as an approach sensor, as indicated by the arrow 32 in FIG. 4b, then it may be necessary to set several distance gates with the aid of the sampling principle. See FIG. 7.

Figure 5:
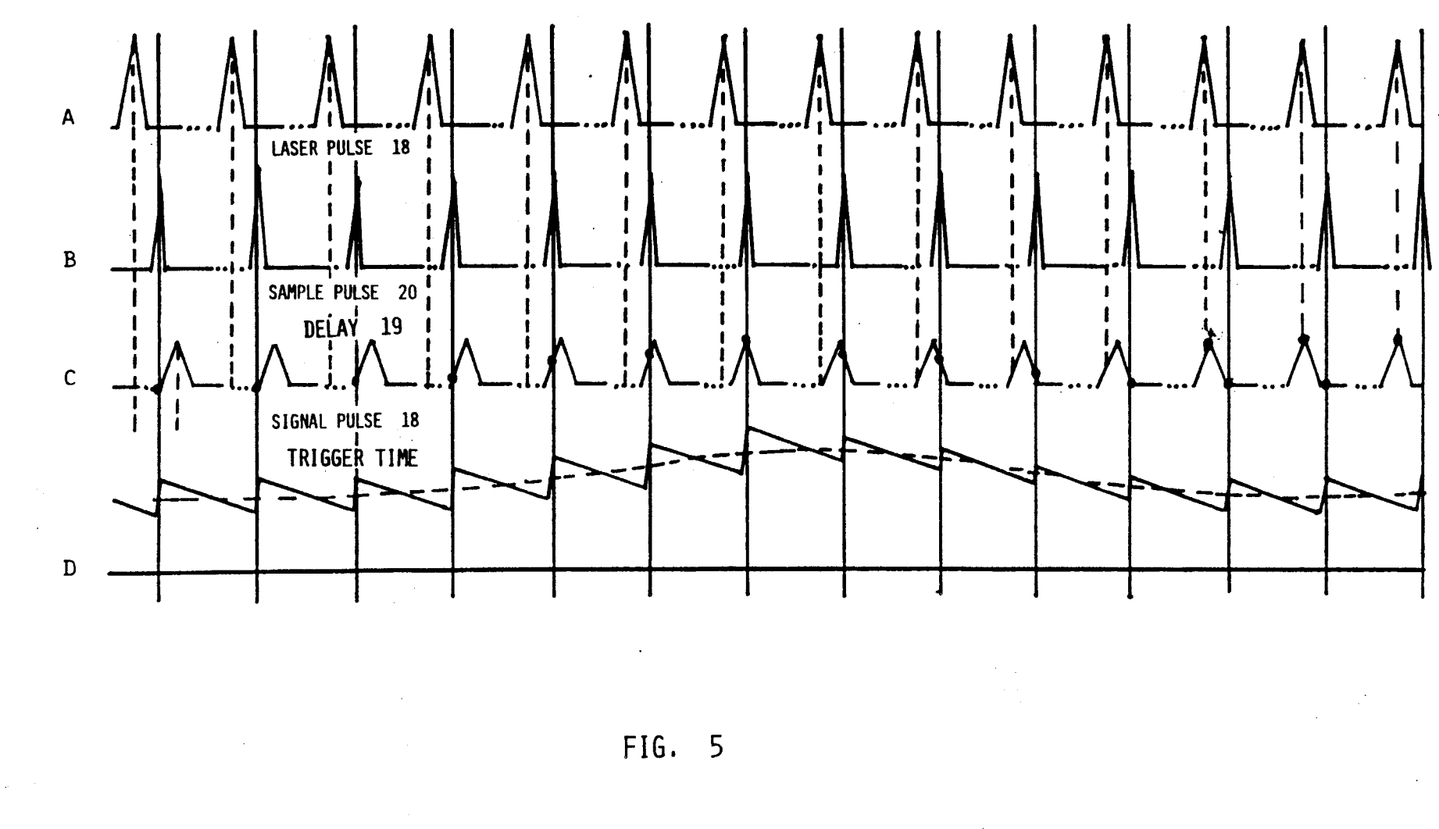
FIG. 5 is a sensor-specific pulse diagram with a sampling pulse (b) which is unmodulated relative to FIG. 1.

For sensing a definite distance from the target, using the sampling principle, one obtains the following electronic construction, illustrated in FIG. 6b. A pulse generator 17 generates a voltage so that the transmitting diode 4 makes an opto-electronic conversion and sends out the laser pulse 18 shown in FIG. 5a. The receiver diode 5 is biased by a high-voltage stage 23 controlled by the pulse generator. A small portion 17' of the pulse-shaped driver voltage is coupled out and after passing the delay line 19 is used as the sampling pulse 20 in FIG. 5b. The delay time 19' is set to correspond to the time of passage of the laser pulse from the sending diode 4 to the target 1 and back to the receiver diode 5. If the sensor 3 approaches a target, no signal is received initially because it does not coincide with the sampling pulse 20. When the target approaches, its signal 18', coming from the left, enters the sampling pulse in sequential periods as shown in FIG. 5c and is detected thereby. The normally required phase modulation of the sampling pulse 20 is not required here in practice any more.

The undelayed low-frequency pulse signal of FIG. 5d, which occurs at capacitor 25 and then passes the low-frequency amplifier, possibly, a pulse shaping circuit 22, which delivers the firing trigger pulse 33. If a silicon avalanche diode is used as receiver diode for reasons of sensitivity, then an appropriate bias voltage must also be produced, as already described. This is done by rectifying the pulse generator voltage using an additional automatic control in which the output noise 24 of the low-frequency amplifier 21 may be used. While the illustration of FIG. 5 only shows approximately 10 pulses forming the low-frequency pulse, in practice the conditions are that, depending on the application, approximately 100 to 1000 pulses are available for forming the low-frequency pulse. This implies a substantial increase of the attainable sensitivity because the signal-to-noise ratio increases as the square root of the number of integrated pulses. As a consequence thereof, when a given laser power is used, larger angular ranges can be monitored.

The approach velocity as between the sensor and the target and the length of the transmitted laser pulse 18 or its extent in free space define the frequency content of the low-frequency pulse obtained by the sampling method. Accordingly, the bandwidth of the low-frequency amplifier 21 can be adapted to the expected signal pulse 18'. For example, if the approach velocity is one m/ms and the length of the pulse is 60 cm at 2 nsec., the pulse, which must traverse the path to and fro, will be imaged for a path change of 30 cm. Therefore, according to the sampling method, it has a duration of approximately 300 μsec. and can be amplified with a bandwidth of only a few kHz. If necessary, the sensor 3 may also be made velocity-selective within certain limits. As the load resistance 30 of the receiver diode 4 needs to be present only for nanosecond pulses, it may be made frequency-dependent (inductive) so that it represents a short circuit for the frequencies that are to be processed by the low-frequency amplifier 21.

Figure 7:
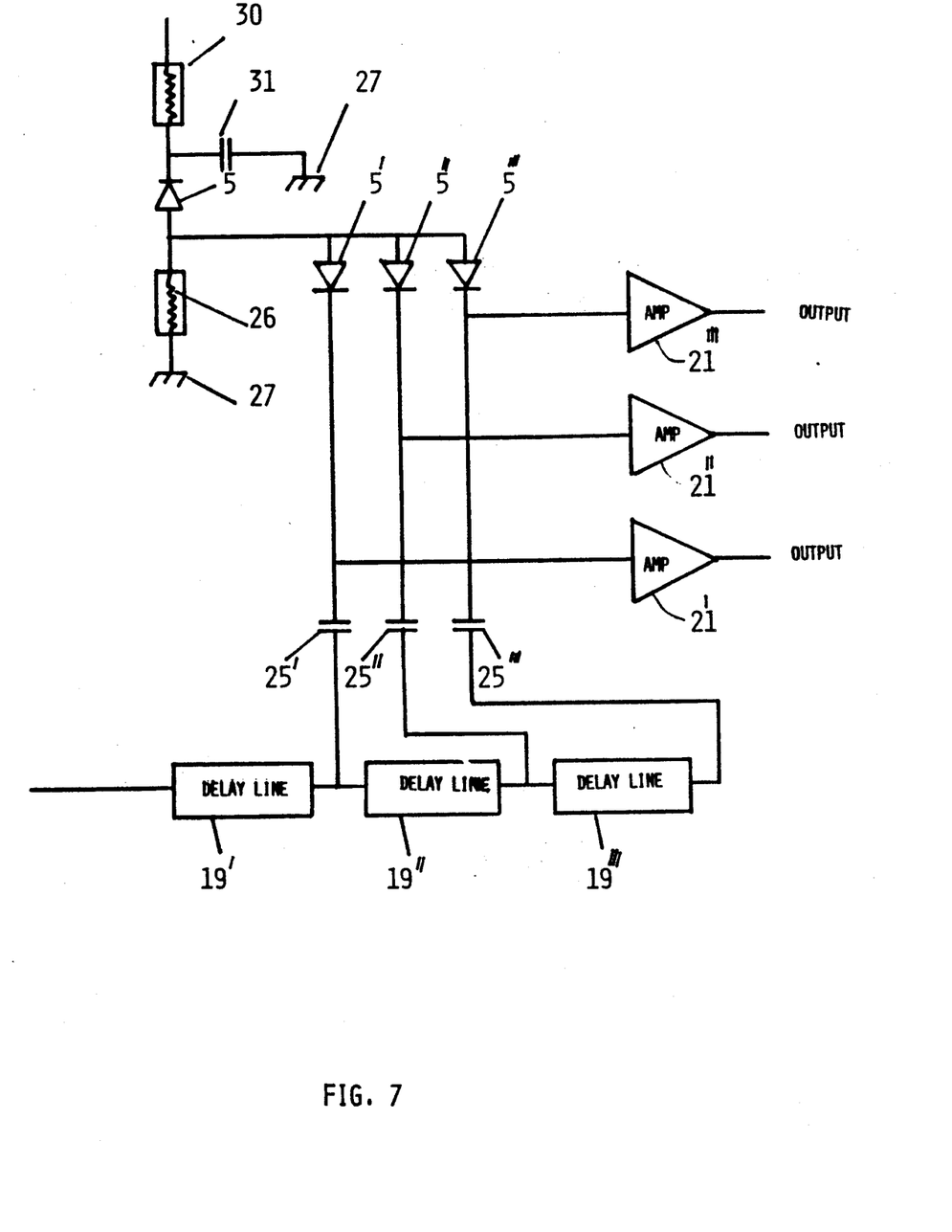
FIG. 7 is part of the block diagram of FIG. 5 with several distance gates.

If it is desired to obtain more precise information about the approach conditions of a target or if additional information regarding the target is to be gathered, it may be necessary to monitor several distance ranges 14, 15 (FIGS. 4 and 9) simultaneously. As shown in FIG. 7, this is possible in that, for each additional distance gate, there is provided an additional delay line 19', 19'', 19''', etc., for the sampling pulse 20, an additional receiver diode 5', 5'', 5''', etc., a further charging capacitor 25', 25'', 25''', etc., and a further low-frequency amplifier 21', 21'', 21''', etc.

Figure 8:
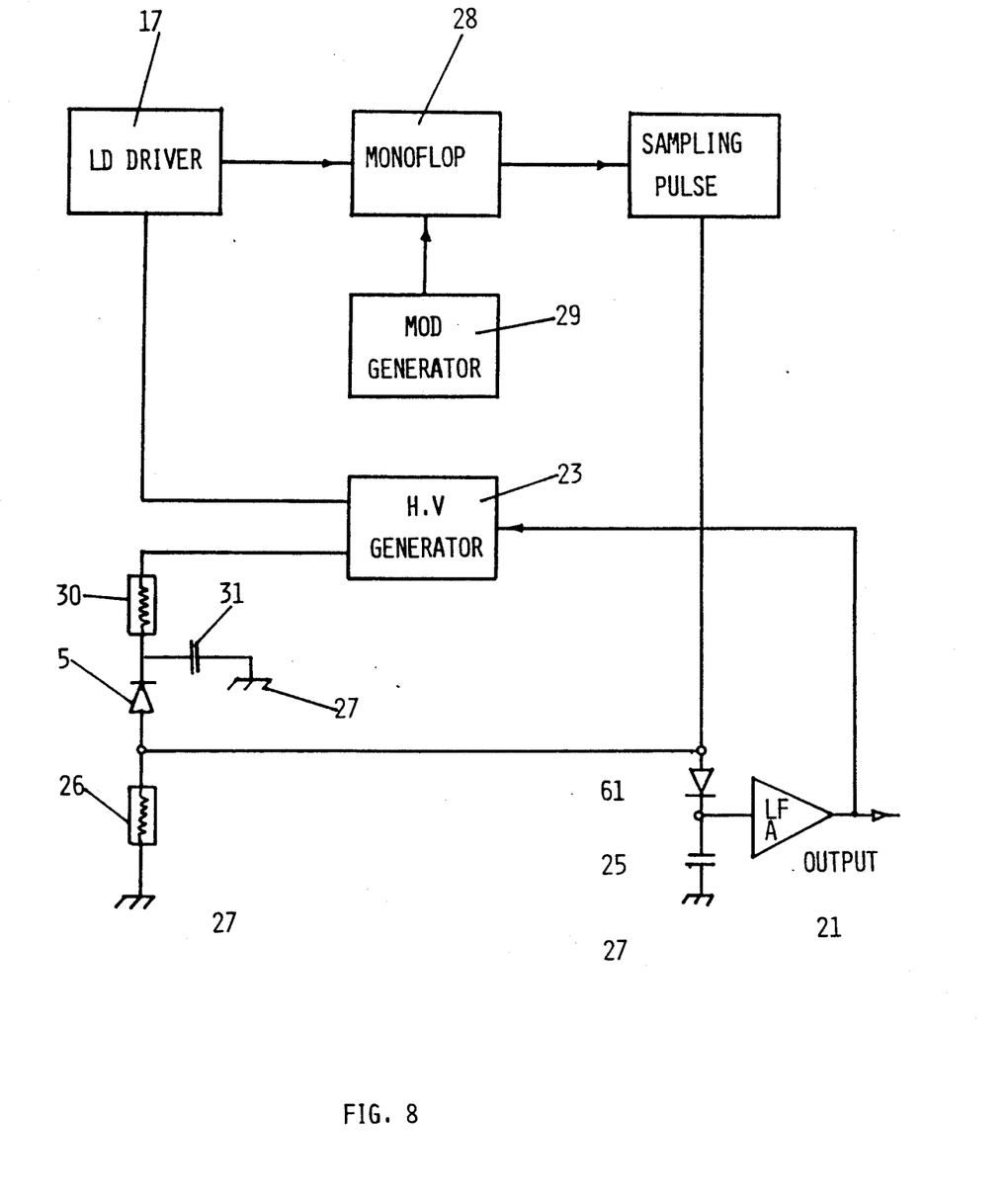
FIG. 8 is a block diagram for monitoring a single distance range.
Figure 9:
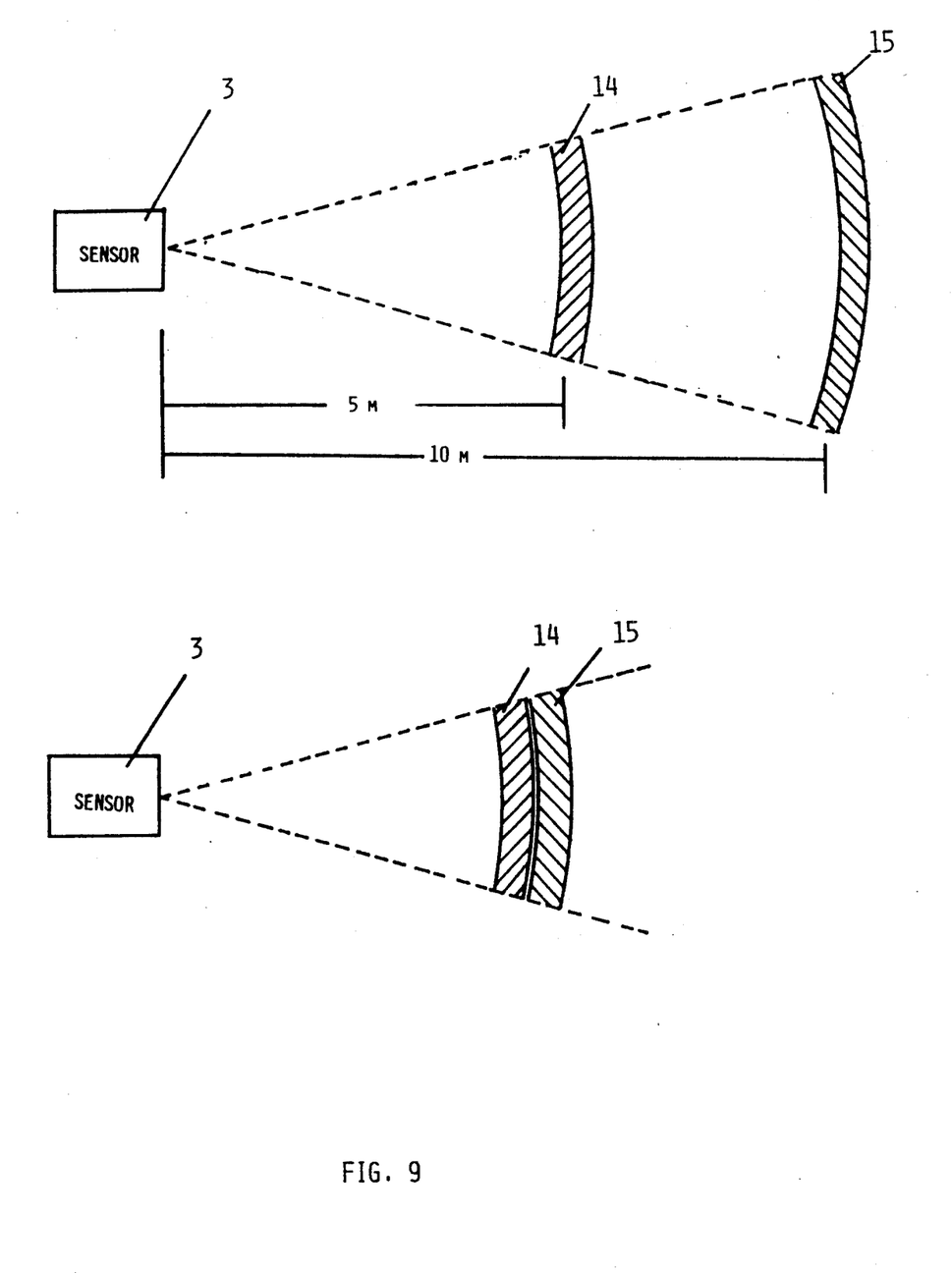
FIG. 9 shows two schemes for monitoring several distances.

The monitoring of a range of distances requires the use of the sampling method according to FIG. 8 with phase modulation of the sampling pulse. In this method, the pulse generator 17 may be used as a trigger for monostable multivibrator 28 whose time constant is varied by a modulation voltage. The sampling pulse is generated by the rear edge of the pulse from the multivibrator. The range to be monitored can be varied at will. It may range from zero to the maximum range or, as shown in FIG. 9a, between two distances, for example between 5 and 10 meters. Of course, the simultaneous monitoring of several ranges is also possible by using several separate sampling pulses, for example a first region from 1 to 5 meters and a second range from 10 to 20 m, and so on.

When several distances are monitored simultaneously, or if a range of distance is monitored, the relative velocity between the sensor and the target as in FIG. 9a can be determined by measuring the time that elapses between the passage of the target, for example, from the second distance range 15 to the first distance range 14.

A further possibility of such monitoring is given in that, when the second distance range 15 to the first distance range 14.

A further possibility of such monitoring is given in that, when the second distance range 15 is traversed, a determination is made whether the target is returning a single reflection or several sequential reflections. The signal is then analyzed and it is decided whether a resulution is even to take place or if the resolution process should respond only to the second or third signal pulse.

This result may then be communicated to a processing stage of the first actual distance gate so that the output signals thereof can be blocked as soon as they occur, i.e., when the analyzed target is located at the actual triggering distance or they may be released only at the second or third signal pulse.

Such a circuit can be used, for example, to make the sensor absolutely insensitive to snow or rain. In such a case, a signal in the second distance gate 15 which was caused by snow would block the signal in the first distance gate 14, also caused by snow. Only when the sensor has approached the target so far that the second distance can no longer be seen would the blocking signal disappear and the sensor would deliver an output signal. For such an arrangement, the first and second distance gates of FIG. 9b should be contiguous or should overlap slightly.

While illustrative embodiments of the invention have been described, it is, of course, understood that various modifications will be obvious to those of ordinary skill in the art. Such modifications are within the spirit and scope of the invention which is limited and defined only by the appended claims.

We claim:

1. An apparatus for optimizing the destructive effect of a projectile equipped with shaped charges, fragmentation ammunition or the like, comprising:
   (a) laser means mounted on the tip of the projectile for emitting signal pulses;
   (b) sensor means mounted at said tip for receiving pulses;
   (c) a transmitting unit coupled to said laser means;
   (d) a receiving unit coupled to said sensor means, said receiving unit cooperating with said transmitting unit to operate as a laser range finder to determine movement information in accordance with a sampling principle and comprising means for the generation of a low frequency representation of said signal pulses by sampling at a relatively high frequency;
   (e) means for supporting said receiving and transmitting units, at positions displaced from the longitudinal axis of the projectile and positioned on opposite sides of said axis to define a passage therebetween;
   (f) a charge being positioned within said passage along said longitudinal axis; and
   (g) detonation means responsive to said receiving and sending units to actuate said charge.

2. An apparatus as in claim 1, wherein said charge comprises a funnel-shaped inset of a hollow charge, said inset being oriented opposite to and with a tip of the inset substantially at the distance of the ogive of the projectile, behind which is disposed a propulsion charge.

3. An apparatus as in claim 1, further comprising an impact fuse which is positioned in the region of the laser range finder, said impact fuse being connected to said detonation means located within the projectile.

4. An apparatus according to claim 3, wherein a load resistance of a laser receiver diode which is biased by a first pulse generator acting via a high-voltage stage is connected to a sampling diode and, therebeyond, in series, to a low-frequency amplifier and a second trigger pulse generator acting via the high voltage stage and directly ahead of the low-frequency amplifier, a pulse coupled out of said first pulse generator and passing through a delay member is admitted as a sampling pulse, while directly beyond the low-frequency amplifier, a part of a then-amplified noise signal is used as a feedback signal to automatically control the high-voltage stage and wherein a resistor grounded at one end has its other end connected to a point ahead of the low-frequency amplifier at which the sampling pulse enters and wherein a resistor grounded at one end has its other end connected between said means for emitting signal pulses and said sampling diode.

5. An apparatus as in claim 4, wherein several distance gates are used, and for each additional gate, a further delay member for the sampling pulse as well as a further receiver diode, a charging resistor and a further low-frequency amplifier are provided.

6. An apparatus according to claim 4, wherein said load resistance is frequency-dependent in its response.

7. An apparatus as in claim 6, wherein said pulse generator serves as a trigger for a monostable multivibrator whose time constant is varied by means of a modulation generator.

8. An apparatus according to claim 3, wherein said receiving unit includes a laser receiver diode, a load resistance of said laser receiver diode being connected to a sampling diode and, therebeyond, in series to a low-frequency amplifier and a trigger circuit, a signal produced from the receiver diode being sampled by a spike pulse derived from a signal pulse outputted by the transmitting unit and provided with a defined time delay and in that a low-frequency image of a pulse outputted by the receiving unit is supplied to the trigger circuit via the low-frequency amplifier.

9. An apparatus as in claim 8, wherein measurement of velocity of approach as between the receiving unit and the target is based on an analysis of frequency content of the low-frequency image of a pulse outputted by the receiving unit.

10. An apparatus as in claim 9, further comprising a push-pull circuit in which the signal pulse is produced in opposite phase, and is then applied to an amplifier.

11. An apparatus as in claim 8, wherein the time delay of the spike pulse is constant.

12. An apparatus as in claim 11, wherein the transmitting unit signal pulse is widened such that it has the diameter of the projectile in the desired time interval.

13. An apparatus as in claim 12 wherein the load resistance of said laser receiver diode is biased by a first pulse generator via a high-voltage stage, being connected to a switching diode and connected therethrough in series with a low-frequency amplifier and a second trigger pulse generator and wherein a pulse, formed by a pulse coupled out of said first pulse generator biased via the high voltage stage and passed through a delay member to generate said spike pulse and a part of a then amplified noise signal is fed back directly behind the low-frequency amplifier as a control signal which automatically controls the high-voltage stage and wherein one end of a capacitor is connected to the point ahead of the low-frequency amplifier where the spike pulse is admitted, the other end of said capacitor being connected to ground and one end of a resistor being connected between said receiver and sampling diodes, the other end thereof being connected to ground.

14. An apparatus as in claim 15 further comprising at least one further delay member for the spike pulse, a further switching diode, a further charging capacitor and a further low-frequency amplifier.

15. An apparatus as in claim 14, wherein a load resistor is embodied as a frequency-dependent impedence.

16. An apparatus as in claim 13, wherein the pulse generator serves as a trigger for a monostable multivibrator which functions as said delay member and the time constant of which is varied by means of a modulation generator.

17. A method for increasing the destructive effect of a projectile equipped with shaped charges, fragmentation ammunition, or the like, comprising the steps of:
   (a) putting the projectile in a flight path toward a target;
   (b) operating a laser range finder to emit signal pulses in the form of an emitted leaser beam from the tip of said projectile in accordance with a sampling principle by generating a low-frequency representation of said signal pulses by sampling at a relatively high frequency and to receive at a sensor sample pulses at said tip;

(c) calculating distance on approach in accordance with said sampling principle; and (d) determining the optimum detonation point and detonating said projectile, wherein approach speed between the sensor and the target and the length of the emitted pulses are used to obtain the frequency content of the low-frequency representation generated in accordance with the sampling principle.

18. A method as in claim 17, wherein push-pull treatment is used to produce with an opposite phase the signal pulse.

19. The method according to claim 18, wherein the sensor acts as a distance sensor; and a required magnitude of phase modulation between the signal pulse and the sampling pulse is furnished automatically due to the decrease in time of flight of the emitted pulse occurring from period to period caused by the decrease in distance.

20. The method according to claim 18, wherein the sensor acts as a distance sensor, and a required magnitude of frequency modulation between the signal pulse and the sampling pulse is furnished automatically due to the decrease in time of flight of the emitted pulse occurring from period to period caused by the decrease in distance.

21. A method as in claim 20, where the emitted laser beam is widened to the diameter of the caliber of the projectile.

22. A method as in claim 18, wherein the emitted laser beam is widened to the diameter of the caliber of the projectile.

23. A method as in claim 17, wherein the emitted laser beam is widened to the diameter of the caliber of the projectile.

* * * * *